US012357861B2

(12) United States Patent
Hart et al.

(10) Patent No.: US 12,357,861 B2
(45) Date of Patent: Jul. 15, 2025

(54) WALL-MOUNTABLE SPRAY HEAD UNIT

(71) Applicant: PLUMIS LTD., Perivale (GB)

(72) Inventors: Alan Hart, Perivale (GB); Yusuf Muhammad, Perivale (GB); William Makant, Perivale (GB); Anderson Horst, Perivale (GB)

(73) Assignee: PLUMIS LTD., Perivale (GB)

( * ) Notice: Subject to any disclaimer, the term of this patent is extended or adjusted under 35 U.S.C. 154(b) by 0 days.

(21) Appl. No.: 17/544,025

(22) Filed: Dec. 7, 2021

(65) Prior Publication Data

US 2022/0088427 A1 Mar. 24, 2022

Related U.S. Application Data

(63) Continuation of application No. 15/524,998, filed as application No. PCT/GB2015/053381 on Nov. 6, 2015, now Pat. No. 11,191,986.

(30) Foreign Application Priority Data

Nov. 6, 2014 (GB) ..................................... 1419773

(51) Int. Cl.
*A62C 31/03* (2006.01)
*A62C 31/28* (2006.01)
*A62C 37/40* (2006.01)

(52) U.S. Cl.
CPC .............. *A62C 31/03* (2013.01); *A62C 31/28* (2013.01); *A62C 37/40* (2013.01)

(58) Field of Classification Search
CPC ......... A62C 31/02; A62C 31/03; A62C 31/00; A62C 31/28; A62C 37/04; A62C 37/10;
(Continued)

(56) References Cited

U.S. PATENT DOCUMENTS 3,588,893 A * 6/1971 McCloskey .......... A62C 99/009 340/630
4,671,362 A 6/1987 Odashima
(Continued)

FOREIGN PATENT DOCUMENTS

CN 2889367 Y 4/2007
CN 203227235 U 10/2013
(Continued)

OTHER PUBLICATIONS

Further Examination Report for application GB1419773.5, report dated Aug. 15, 2018, UK Intellectual Property Office, 3 pages.
(Continued)

*Primary Examiner* — Cody J Lieuwen
(74) *Attorney, Agent, or Firm* — Francis J. Maguire; WARE FRESSOLA MAGUIRE & BARBER LLP

(57) ABSTRACT

A wall-mountable spray head unit (11) is described. The spray head unit includes a rotatable spray head assembly (8$_1$, 8$_2$; FIG. 9, 8$_3$; FIG. 17) which comprises a spray manifold (18$_1$, 18$_2$; FIG. 9) rotatable about a first axis (17), a spray nozzle (19) supported by the spray manifold and orientated to deliver fire-suppressant material radially in a plane in a plane defined by the first axis and a second axis which is perpendicular to the first axis, and at least one thermal sensor (20).

6 Claims, 17 Drawing Sheets

(58) Field of Classification Search

CPC ......... A62C 37/00; A62C 37/36; A62C 37/38; A62C 37/40; B05B 3/12; B05B 3/02; B05B 15/62; B05B 15/68; B05B 12/12–126

USPC ............ 169/37–41, 56, 60, 61, 90; 239/227, 239/263.1, 263.3–265, 282, 283

See application file for complete search history.

(56) References Cited

U.S. PATENT DOCUMENTS

| | | | | |
|---|---|---|---|---|
| 4,800,285 A * | 1/1989 | Akiba | G08B 17/12 250/554 |
| 4,821,805 A | 4/1989 | Saito et al. | |
| 4,909,329 A | 3/1990 | Yoshida et al. | |
| 5,548,276 A * | 8/1996 | Thomas | A62C 37/38 250/342 |
| 5,727,634 A * | 3/1998 | Ishida | A62C 31/05 169/61 |
| 6,111,511 A * | 8/2000 | Sivathanu | G08B 17/12 340/630 |
| 6,425,537 B1 | 7/2002 | Nielsen | |
| 7,066,273 B2 | 6/2006 | Tan | |
| 7,861,947 B1 * | 1/2011 | Watson, Sr. | B05B 15/74 239/281 |
| 2012/0018179 A1 | 1/2012 | Munro | |

FOREIGN PATENT DOCUMENTS

| | | | |
|---|---|---|---|
| GB | 2 174 002 | A | 10/1986 |
| JP | 2011 072813 | A | 4/2011 |
| JP | 2013-41604 | A | 2/2013 |
| KR | 101553775 | B | 9/2015 |

OTHER PUBLICATIONS

International Search Report mailed Feb. 4, 2016, Application No. PCT/GB2015/053381, 4 pages.

Search Report, Intellectual Property Office, application No. GB1419773.5, dated Apr. 12, 2016, 5 pages.

English Abstract, JP2011072813A, 2 pages.

English Abstract, KR101553775B, 2 pages.

English Abstract, CN2889367Y, 2 pages.

English Abstract, JP2013041604A, 2 pages.

Slaton et al., "Fire Away! A Smart, Servo-Controlled Fire Extinguisher," ECE 4760: Final Project, Cornell University, Electrical & Computer Engineering, 2013, 19 pages.

Glockling et al., "Development of a robotic local suppression system for the marine environment," Suppression and Detection Research and Applications, A Technical Working Conference (SUPDET 2008) Mar. 11-13, 2008, 13 pages.

Manual, IFEX 3000 Impulse Fire Extinguishing Technology, IF3000-100, Trolley Fire Extinguisher Typ IFEX 3035 and IFEX 3050, Nov. 20, 2012, 29 pages.

Company Brochure, FIREXPRESS, First Strike Fire Fighting, Jan. 2010, 12 pages.

* cited by examiner

WALL-MOUNTABLE SPRAY HEAD UNIT

FIELD OF THE INVENTION

The present invention relates to wall-mountable spray head unit for a fire suppression system.

BACKGROUND

Residential densification, population migration and restrictions on planning and building have led to very high property values in many urban and suburban areas, in many regions of the world. This has led in turn to increased property prices even in many rural areas. Where it occurs, this trend drives property developers to maximise the use of space, yet building regulations often require certain safety features and certain types of layout that use up space.

In addition to usable floor area, consumers have been found to value certain aesthetic and practical configurations within their homes. Notably, media exposure has led consumers to expect more glamorous homes, often with open layouts where escape routes pass through living areas.

For example, in England and Wales, building regulations insist on additional staircases in taller houses, require that space be used to create lobby spaces within apartments, and require that staircases and exit routes not pass through living areas, all to facilitate safe escape from fire. In addition they mandate that buildings are erected within a certain distance of nearby roads in order to facilitate fire engine access. These stipulations can greatly reduce the value of the property that may be created on a given piece of land.

This tension between fire safety regulations and consumer expectations and desires exists both in new construction projects and in the conversion of basements, lofts and other similar types of space into living space and the reconfiguration of partitioned living space into open-plan areas.

Fire sprinklers and other fire suppression systems are sometimes used in residential and domestic properties as a means to improve the inherent safety of the property and to compensate for particular risks and hazards, and under certain conditions may allow all of the above stipulations to be bypassed.

Despite the design flexibility that they enable, fire sprinkler systems are much less commonly found in residential properties than they are in industrial and commercial premises, due to one or more factors such as cost, concern over water damage, and difficulties with retrofitting a sprinkler system into an existing property. Some alternatives to domestic fire sprinkler systems are gaining popularity; for example one fire suppression system is marketed by Plumis Ltd. under the name "Automist". Such systems may offer a range of benefits:

- They may operate with much reduced water flow requirements compared to sprinkler systems. For example, an Automist system with a single pump draws approximately 5.6 litres per minute, whereas a more conventional sprinkler system might be specified to use over 100 litres per minute for the same room size.
- They may therefore create less water damage when activated.
- They may avoid the large one-off costs of a more conventional sprinkler system and therefore be more cost-effective when installed in a localised zone.
- They may be easier, faster, less disruptive and less expensive to retrofit to an existing property.
- They may have an aesthetically superior appearance when compared to a sprinkler system.

- They may allow retention of period features such as ceiling plasterwork.
- They may use less space than tank-based sprinkler systems and even avoid consequent structural reinforcements.
- Their lower water demand may create fewer uncertainties and dependencies, leading to a more predictable installation process and costs than would be the case with fire sprinklers.

These alternative suppression systems also have some disadvantages. Although they may provide adequate life safety for building occupants in many circumstances, their low water usage is a significant constraint and they do not in general provide fully equivalent performance to a full fire sprinkler system.

Residential and domestic fire suppression systems are usually installed in order to allow a property to comply with regulations. Since the alternative systems such as Automist are designed differently to conventional sprinkler systems, therefore do not follow existing standards such as B59251 or B59252, and may perform differently in fires, they are therefore difficult to compare with the better-known option of fire sprinklers. To date, this has limited the applicability of these alternative products, as people charged with enforcing the aforementioned regulations may not be able to come to a quick and complete decision regarding such products and in their doubt may insist on the use of conventional fire sprinklers in lieu of the alternative system that the consumer or property developer may prefer. For example, the Automist system is widely approved for building regulations purposes for use in certain types of open-plan three-story house, but much less widely in open plan flats.

Despite the limitations on approval, alternative fire suppression systems have grown in popularity among consumers, architects and property developers. A key factor limiting the sale of such products is their lack of demonstrable equivalence to sprinklers in their fire performance. Therefore, an alternative fire suppression system should have a major advantage in the marketplace if it could retain the advantages mentioned above such as low flow, predictable installation complexity, reduced water damage, low cost, small size and non-disruptive installation, whilst achieving similar fire performance to conventional sprinklers.

Some steerable fire suppression systems are known in the art. The Shipboard Intelligent Fire Suppression System (SIFSS) demonstrated by the Fire Protection Association and the Royal Navy comprises a stereoscopic camera system, proprietary "SigniFire" image processing software and a steerable "Akron Brass FireFox" fire hose amongst other elements. Reference is made to J. L. D. Glockling et al.: "Development of a robotic local suppression system for the marine environment", Suppression and Detection Research and Applications—A Technical Working Conference (SUPDET 2008) Mar. 11-13, 2008. The system includes software that is able to account for the approximately parabolic motion of a water jet and hence direct the fire hose to extinguish a fire in a specific location, based on the stereoscopic observation and consequent deduction of the fire location in three dimensions. Reference is also made to The IFEX impulse Gun marketed by IFEX GmbH, Sittensen, Germany (http://www.ifextechnologies.de/eng/content/references/portable_equipment.pdf) and the FIREEXPRESS system (http://www.firexpress.com/Files/Microdrops%20the%20FE%20way.pdf), both of which operate at approximately 25 bar.

The SIFSS has not been adapted for domestic and residential use and such an adaptation would pose a number of challenges; notably:

- a large cost reduction, by a factor of approximately fifty, would be required in order to create a system commensurate with residential and domestic expectations of cost. Notably the SIFSS uses a complex computer system, a large and expensive steerable spray head that is aesthetically unsuitable for widespread home use, and a water flow greatly in excess of that available in most homes (up to 1900 litres per minute).
- the use of multiple in-home cameras creates not only the fear in residents, but also the real possibility, that their privacy may be violated, and preferably an alternate detection and activation mechanism would be required;
- a system functioning as an automated steerable firehose in the home would have to make trade-offs between the flow required, the area to be covered, and the moment at which the system is designed to activate. Early activation when the fire is small could mean that furniture could shield the fire from the sensors, while later activation might require a wider, less directed spray to account for the possibility of a larger fire.

A steerable suppression system for the home is described in U.S. Pat. No. 7,066,273 B1. U.S. Pat. No. 7,066,273 B1 envisages a primarily ceiling-mounted system with at least two axes of movement, using infra-red detection.

A similar system was demonstrated on a small scale described in T. Slaton & D. Xiang "Fire Away! A Smart, Servo-Controlled Fire Extinguisher" (2013) (http://people.ece.cornell.edu/land/courses/ece4760/FinalProjects/f2013/tms245 dz x3/tms245_dzx3/.

Both of these systems require a relatively complex mechanism and a relatively slow two-dimensional scan in order to locate a fire, qualities which hinder the creation of a low-cost but effective product.

Both of these systems also propose to use only infra-red detection. It is unlikely that a commercial product based on these systems would be able to operate as described due to the risk of nuisance activation. Although U.S. Pat. No. 7,066,273 B1 points out that thermal lag in a traditional thermal-reactive fire suppressant system leads to a long response time and therefore the risk of ineffective suppression, the infra-red detection is not normally used alone to activate an alarm system or a suppression system, as the risk of nuisance alarms is significant and the consequences of activation can be serious. Indeed, T. Slaton & D. Xiang ibid. discuss the risk of nuisance alarms but propose an infra-red only solution in contrast to common industry practice. Fire suppression systems are generally installed for reasons of regulatory/legal/code compliance and therefore when a sale takes place, the offered benefit of compliance must exceed the "disbenefits" of the installation in the purchaser's mind. In the case of a suppression system for the home, any perceived possibility of nuisance activation risks rendering the system not commercially viable because of the potential property damage entailed.

SUMMARY

According to a first aspect of the present invention there is provided a wall-mountable spray head unit. The spray head unit comprises a rotatable spray head assembly which comprises a spray manifold rotatable about a first axis, a spray nozzle supported by the spray manifold and orientated to deliver fire-suppressant material (such as water or a water-based material) radially in a plane defined by the first axis and a second axis which is perpendicular to the first axis. The spray head unit further comprises at least one thermal sensor configured to sense in the plane.

The spray head unit can be easily installed in a home and used in lieu of a fire sprinkler. The spray head unit can provide comparable performance to sprinkler.

The rotatable spray head assembly may comprise one or more thermal sensors supported by the spray manifold aligned with the plane. Thus, the thermal sensor(s) move with the nozzle.

The thermal sensor may take the form of a wide-angle thermal camera or row of thermal sensors and has a sufficiently wide range of view. A controller may look at pixels corresponding to a direction in which the nozzle is aimed. Thus, the thermal camera or row of thermal sensors may allow the unit to perform a virtual scan. The camera or row of discrete thermal sensors may be fixed, i.e. not move with the spray manifold.

The spray head can be used to deploy a liquid, such as water or a mixture of water and an additive (which may create a foam), or a gas, such as carbon dioxide.

The first axis may be a substantially vertical axis and the plane may be a substantially vertical plane. The second axis may lie substantially in a horizontal plane.

The spray manifold may be only rotatable about the first axis. This can help simplify operation of the spray head unit and, thus, reduce complexity and cost of the unit.

The spray manifold may be rotatable about another axis.

The spray head unit may further comprise an inlet port in fluid communication with the nozzle. The inlet port is preferably offset in a direction into the wall with respect to the first axis. This can allow a supply hose or pipe to be recessed in the wall while allowing the centre of rotation of the spray manifold to be further forward. The inlet port may be co-axial with the first axis.

The, or each thermal sensor, may comprise an infrared thermometer. The, or each thermal sensor, may comprise an infrared camera. The, or each thermal sensor, may comprise a sensor which detects flames rather than directly detecting heat.

The spray manifold may include a face (which may be flat or curved) and the spray head and, if disposed in the spray manifold, the at least one thermal sensor may be set in the face.

The spray nozzle and the thermal sensor may be offset in a direction parallel to the first axis. For example, the nozzle may lie just above the thermal sensor or just above the middle of a row of sensors.

The spray head unit may further comprise an actuator configured to cause rotation of the spray manifold about the first axis. The actuator may be a servo motor.

The spray head unit may comprise two or more nozzles.

The spray head unit may comprise an enclosure having an aperture and the rotatable spray head assembly may be housed or mainly housed in the enclosure. The enclosure may comprise a first and second end plates and tubing interposed between the first and second end plates. A front endplate may comprise the aperture. The spray head unit may further comprise an additional face plate. The enclosure may comprise a mounting box (for example, an electrical mounting box) and a faceplate.

The rotatable spray head assembly may be arranged such that, in a parked position, the nozzle and thermometer are not visible through the aperture (when observed from outside the assembly). The rotatable spray head assembly may be arranged such that, in an operating position, the nozzle and thermometer are visible through the aperture or the nozzle and thermometer protrude through the aperture.

The rotatable spray head assembly may comprise a gate valve and may be arranged, such that, in a parked position, the gate valve is closed.

The spray head unit may further comprise a control unit operatively connected to the at least one thermal sensor and configured to control rotation of the rotatable spray head assembly. The control unit may comprise a microcontroller.

The spray head may be configured, in use, to sweep the rotatable spray head assembly through an angular range around the first axis of at least 120°. The spray head may be configured, in use, to sweep the rotatable spray head assembly through a first angular range for locating a fire and through a second, smaller or larger angular range for deploying the fire-suppressant material.

The spray head may be configured to deliver the mist of fire-suppressant material in arc in the plane (i.e. the vertical plane) of at least $2\times\alpha°$. $\alpha$ may be at least 25°. $\alpha$ may be no more than 60°, 55° or 40°. Preferably, $\alpha$ is about 32°.

The spray head unit may be configured to deliver a mist of the fire-suppressant material. The fire-suppressant material may be water or a mixture containing water. The spray head unit may be configured to deliver a watermist.

According to a second aspect of the present invention there is provided a fire suppression system comprising at least one wall-mountable spray head unit, which is wall mounted, at least one pressure generator for supplying fire suppressant material under pressure to the at least one wall-mountable spray head and at least one activation device which, in response to an activation signal, causes fire suppressant material to spray out from the spray head(s) of the at least one wall-mountable spray head unit.

The spray head unit may be mounted in wall-like objects which are not necessarily walls. For example, the spray head unit may be mounted to a pillar, a false wall, or a wall of a set of shelves or other piece of furniture According to a third aspect of the present invention there is provided a building automation system including a fire suppression system according to the second aspect of the invention which is remotely controllable.

The building automation system may include at least one camera. The system may be configured to transmit images from the camera to a remote location, such as a server.

The system may be configured to receive from a remote location, a signal to selectably activate or deactivate the fire suppression system.

According to a fourth aspect of the present invention there is provided a method of operating a spray head unit, the method comprising, in response to a trigger, rotating the spray head assembly about the first axis, monitoring signals from the at least one thermal sensor, processing the signals so as to identify a desired angle of rotation, and causing the spray head assembly to stop rotating at the desired angle of rotation.

Rotating the spray head assembly comprises sweeping the spray head back and/or forth at least once.

The method may comprise starting to deliver the fire-suppressant material after the spray head assembly has stopped rotating at the desired angle of rotation.

The method may be implemented in software or in hardware.

According to a fifth aspect of the present invention there is provided a computer program which, when executed by at least one or more processors, causes the processors to perform the method.

According to a sixth aspect of the present invention there is provided a hardware processor, such as an FPGA, which is configured to perform the method. According to a seventh aspect of the present invention there is provided a computer readable medium, optionally a non-transitory computer readable medium, which stores or carries the computer program.

BRIEF DESCRIPTION OF THE DRAWINGS

Certain embodiments of the present invention will now be described, by way of example, with reference to the accompanying drawings, in which.

DESCRIPTION OF CERTAIN EMBODIMENTS

Figure 1:
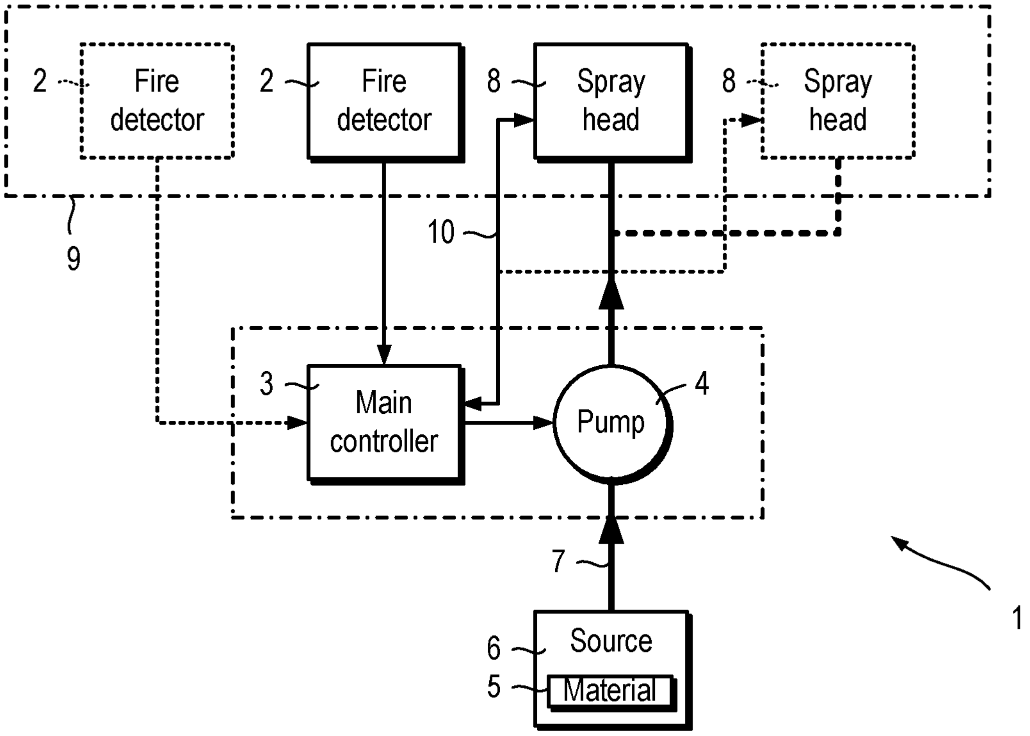
FIG. 1 is a schematic block diagram of a fire suppression system which includes at least one spray head for spraying fire suppressant material.

In the following description, like parts are denoted by like reference numerals.

Referring to FIG. 1, a fire protection system 1 (which may also be referred to as a fire suppression system) is shown.

The system 1 includes at least one fire detector 2, a main controller 3, a pump 4 for supplying fire suppressing material 5, in this example water, from a source 6 via piping 7 to at least one rotatable spray head assembly 8 (herein also referred to simply as a "spray head"). As shown in FIG. 1, the fire detector 2 and the spray head 8 may be co-located in one space 9. The main controller 3 and the spray head 8 are connected by communication line 10.

The general principle of operation of the system is described in WO 2010/058183 A1 which is incorporated herein by reference.

Figure 2:
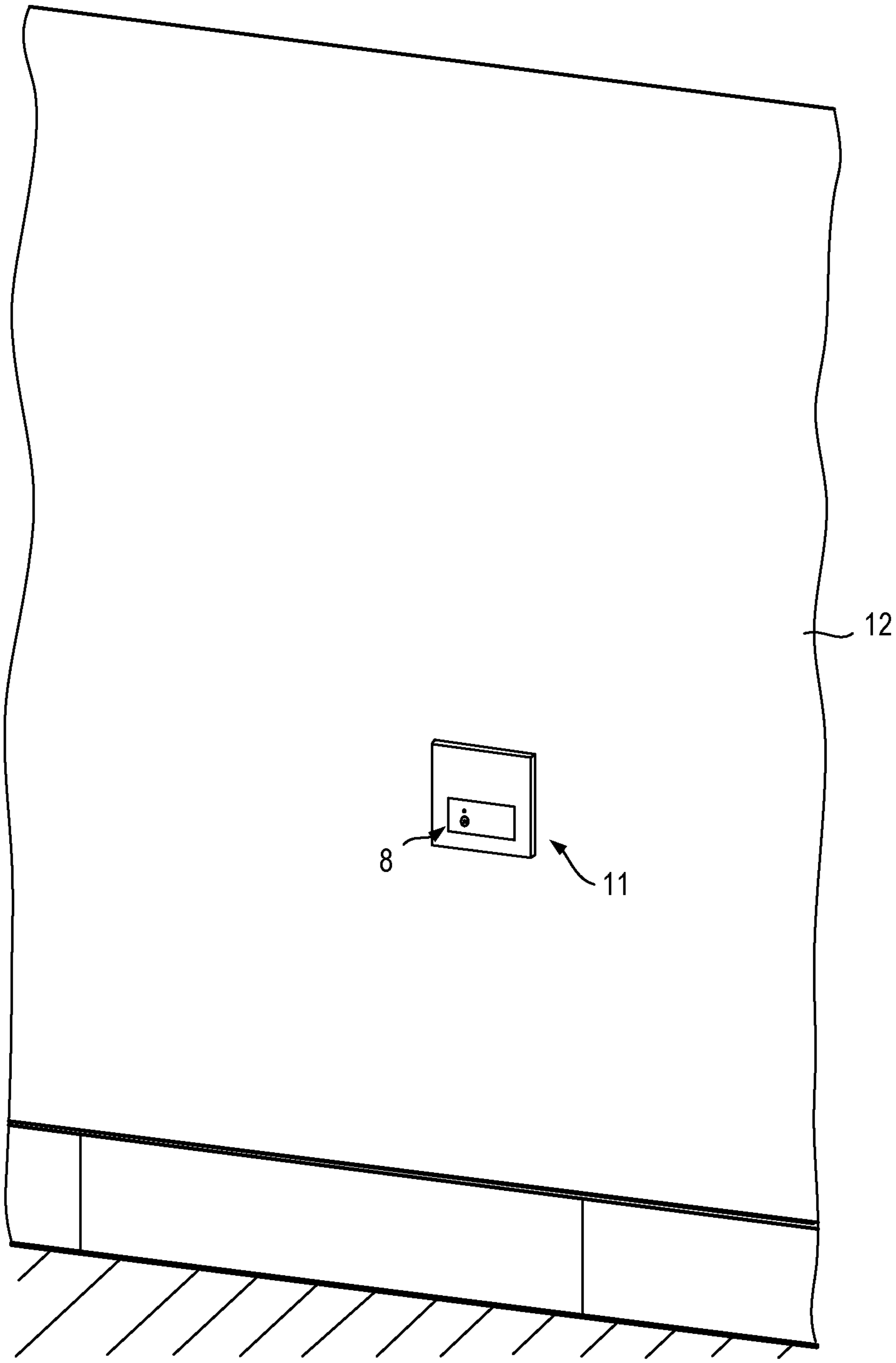
FIG. 2 is a perspective view of a wall and a wall-mounted spray head unit which includes a rotatable spray head assembly.

Referring also to FIG. 2, each spray head 8 forms part of a spray head unit 11 which is mounted to a wall 12. When the system 1 is activated, the pump 4 delivers water 5 at high pressure, in this example about 80 bar (8 MPa), and the spray head 8 sprays a fine mist of water.

Figure 3:
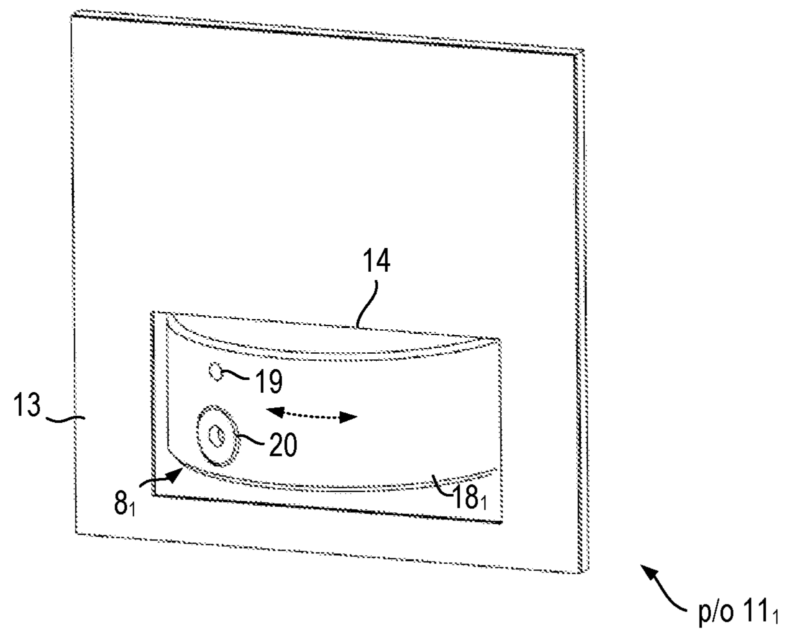
FIG. 3 is perspective view of a front of a first spray head unit.
Figure 4:
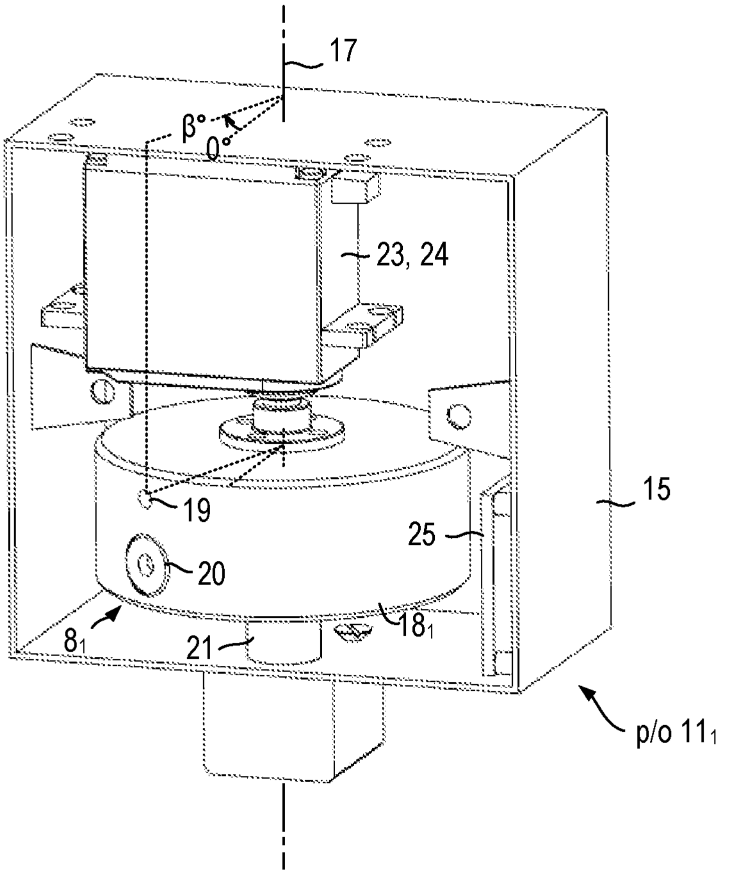
FIG. 4 is perspective view of the first spray head unit shown in FIG. 3 without a front cover.
Figure 6:
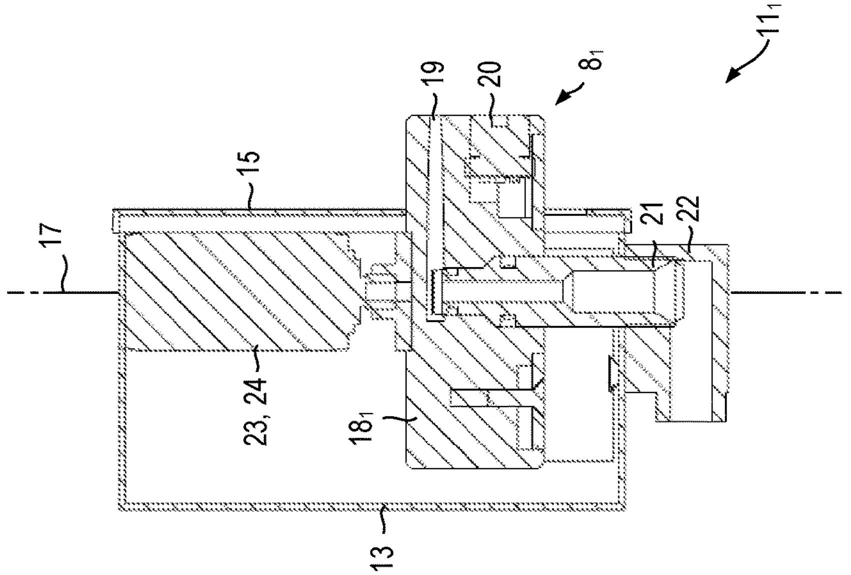
FIG. 6 is a cross section of the first spray head unit shown in FIG. 5 taken along the line A-A'.
Figure 5:
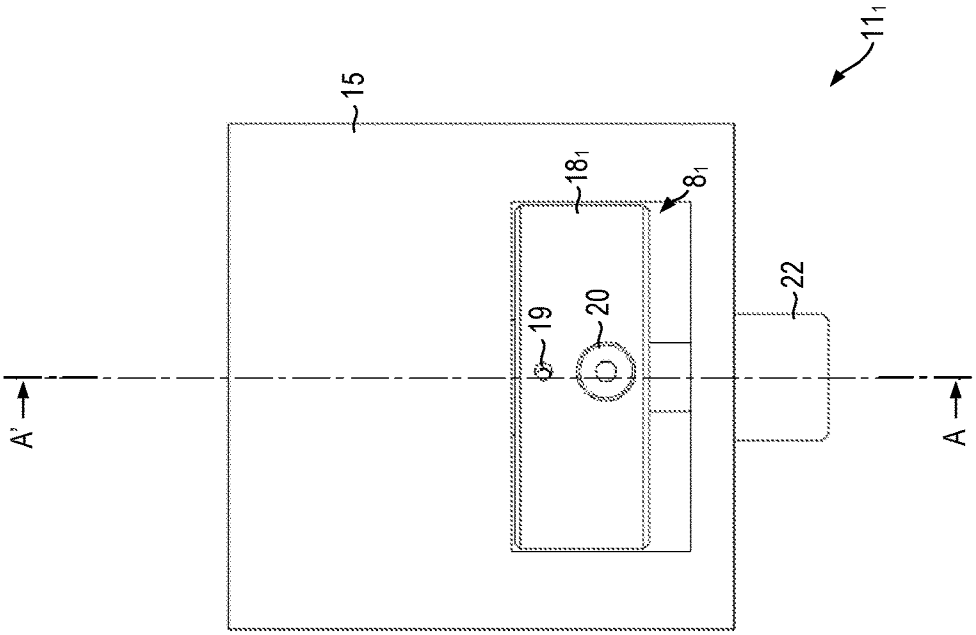
FIG. 5 is a front elevation of the first spray head unit shown in FIG. 3.

Referring to FIGS. 3 to 5, a first spray head unit $\mathbf{11}_1$ is shown.

The first spray head unit $\mathbf{11}_1$ comprises a faceplate 13 having an aperture 14 and a main enclosure portion 15 (herein also referred to as a "mounting box"). Preferably, the main enclosure portion 14 sits in a recess (not shown) in the wall 12.

The first spray head unit $\mathbf{11}_1$ comprises a first rotatable spray head assembly $\mathbf{8}_1$ which can turn on one, vertical axis 17. The rotatable spray head assembly $\mathbf{8}_1$ comprises a disc-shaped spray manifold $\mathbf{18}_1$, a spray nozzle 19, a thermal sensor 20 aligned with the nozzle 19, and an inlet port 21 which may be coaxial with the rotatable spray head assembly's axis of rotation 17.

The spray nozzle 19 is configured to deliver liquid droplets in a specific azimuthal direction, i.e. at an angle β°, dependent on the rotary position of the spray head assembly $\mathbf{8}_1$. The spray nozzle 19 may be fabricated as part of the manifold $\mathbf{18}_1$ or as a separate insert.

The thermal sensor 20 is preferably a non-contact thermopile-based infrared thermometer, such as the Melexis MLX90614xCC with a conical field of view where the cone's full angle is approximately 35°.

If a centre position of the rotatable spray head assembly is considered to be at a reference angle 0°, whereby the sensor and nozzle(s) are directed perpendicularly to a flat vertical wall 12 then the assembly is arranged to rotate the spray nozzle 19 to angle β° to be sufficiently close to the ±90° positions so as to allow the Coanda effect to carry the mist spray in either direction along the mounting wall 12. Preferably this is achieved by allowing a sufficiently large rotational freedom that the modulus of this azimuthal angle can reach a value as far as ±75° in both directions. Preferably, the rotatable spray head assembly has a "parked" position where the sensor and spray nozzle are not visible from outside the mounting box 15 and faceplate 13. This parked position is reached by driving the azimuthal angle close to or beyond one of the +/−90° positions.

The spray head unit $\mathbf{11}_1$ comprises a liquid supply hose (not shown), terminated with a mating coupler 22 designed to be inserted into the rotatable spray head assembly's inlet port 21.

The mounting box 15 is fire-resistant. The mounting box 15 allows the rotatable spray head assembly 8 to be mounted in a stable manner to a wall 12 (FIG. 2) whilst allowing the assembly to rotate on its axis 17, the mating coupler 22 remaining firmly in place during rotation. The mounting box 15 provides fixing features, preferably threaded holes (not shown) which can accept bolts (not shown), to allow the faceplate 13 to be attached.

The spray head unit 11 includes a rotary actuator 23 and a position sensor 24. The actuator and position sensor 23, 24 are provided by a servo motor. The spray head unit $\mathbf{11}_1$ also includes a gear train (not shown), a control unit 25, sensor cabling (not shown) and a communication line 10 whereby the spray head unit 12 may be controlled by other devices and/or may control other devices.

Referring to FIGS. 7 to 11, a second spray head unit $\mathbf{11}_2$ is shown.

The second spray head unit $\mathbf{11}_2$ is the same as the first spray head unit $\mathbf{11}_1$ (FIGS. 3 to 6) except that it comprises a second rotatable spray head assembly $\mathbf{8}_2$ which comprises an elongate box-shaped spray manifold $\mathbf{18}_2$.

The box-shaped spray manifold $\mathbf{18}_2$ has a long, flat side face 26 and an end face 27. The nozzle 19 and sensor 20 are disposed in the end face 27.

Figure 7:
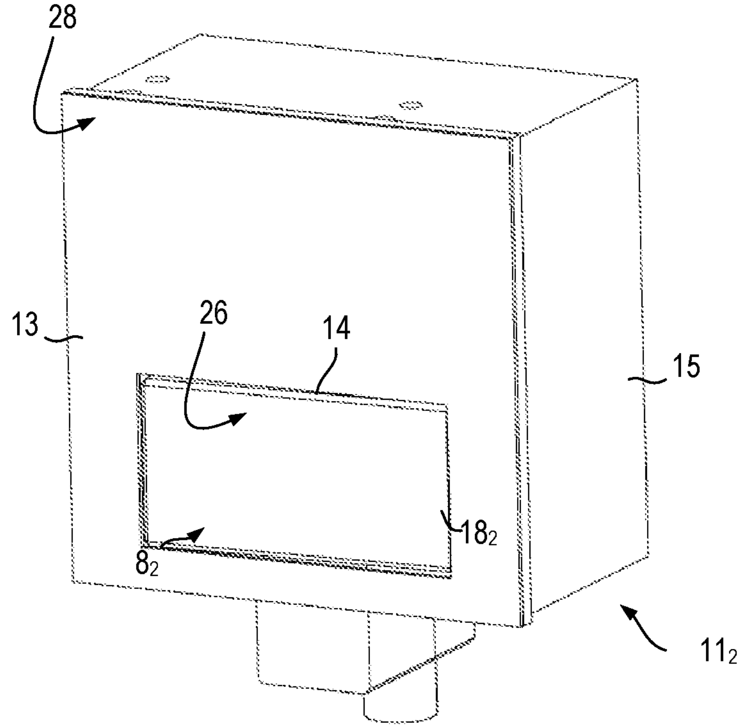
FIG. 7 is perspective view of a front of a second spray head unit in which a manifold is in a parked position.

Thus, the second rotatable spray head assembly $\mathbf{8}_2$ may held in parked position (as shown in FIG. 7) whereby flat side face 26 is presented through the aperture 24 and is flush with a front face 28 of the faceplate 23.

Any gap between the rotating manifold $\mathbf{18}_1$, $\mathbf{18}_2$ and the faceplate 13 which is formed around the edge of the aperture 13 may be protected from ingress by a seal or brush (not shown). The gap may also be designed to allow light to escape from the interior of the mounting box in a visually appealing and/or useful and indicative manner.

Referring to FIGS. 12 to 23, a third spray head unit $\mathbf{11}_3$ is shown.

Although the third spray head unit $\mathbf{11}_3$ has a similar appearance to the second spray head unit $\mathbf{11}_2$ (FIG. 7) when installed, for example, in that the third spray head unit $\mathbf{11}_3$ has an elongate box-shaped spray manifold $\mathbf{18}_3$, it differs in several respects.

Figure 8:
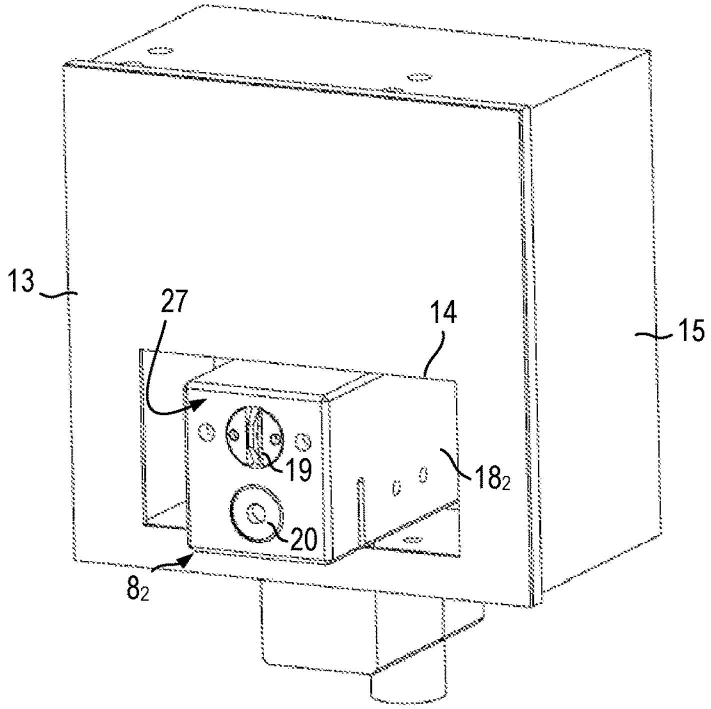
FIG. 8 is perspective view of a front of a second wall-mounted spray head unit.
Figure 9:
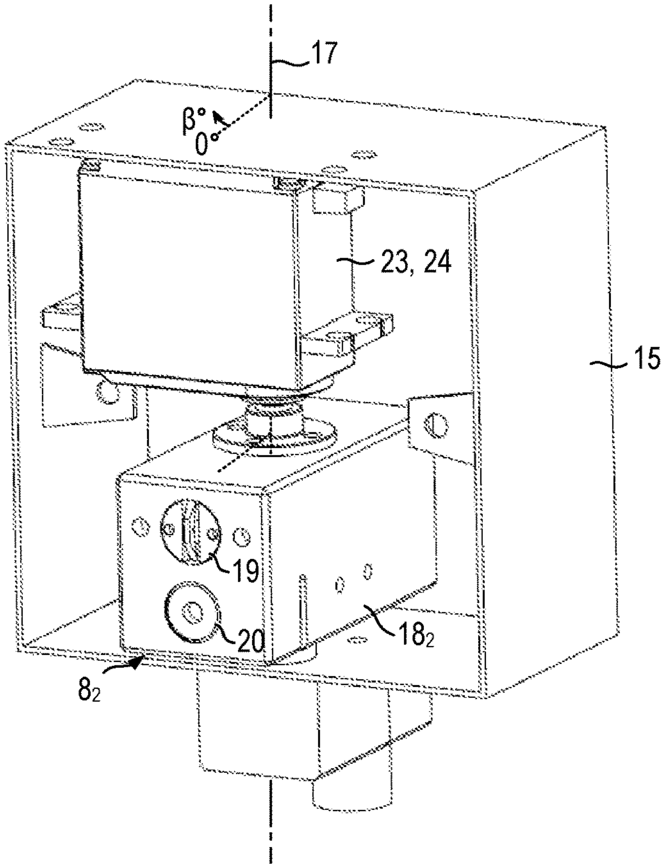
FIG. 9 is perspective view of the second spray head unit shown in FIG. 8 without a front cover.
Figure 11:
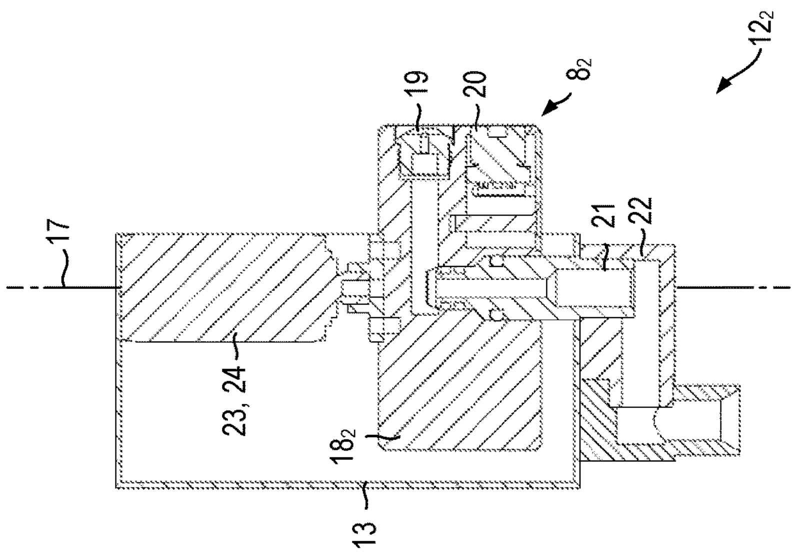
FIG. 11 is a cross section of the second spray head unit shown in FIG. 9 taken along the line B-B'.
Figure 10:
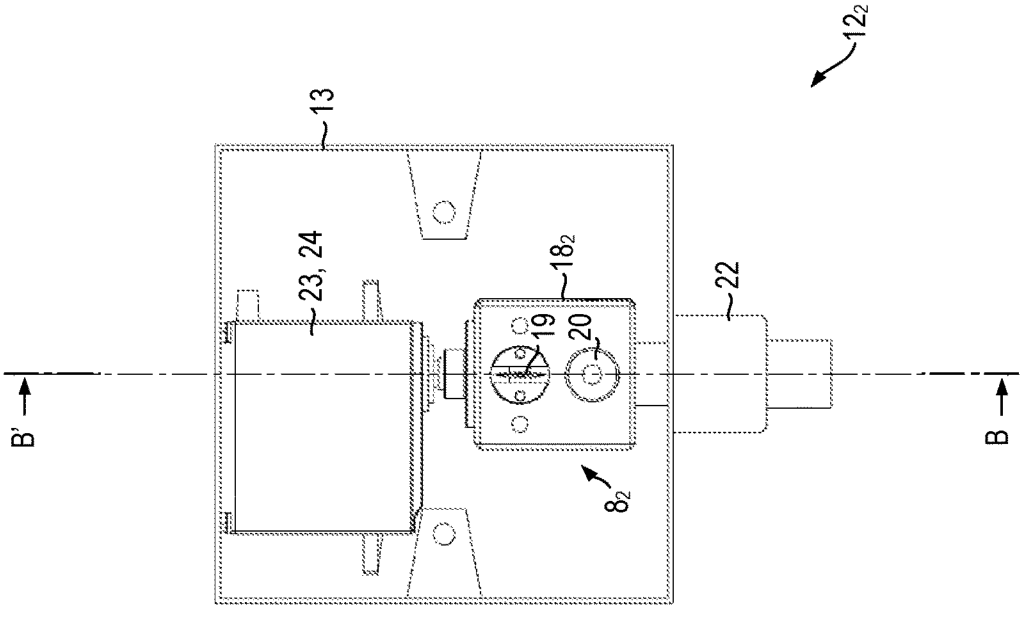
FIG. 10 is a front elevation of the second spray head unit shown in FIG. 8.
Figure 12:
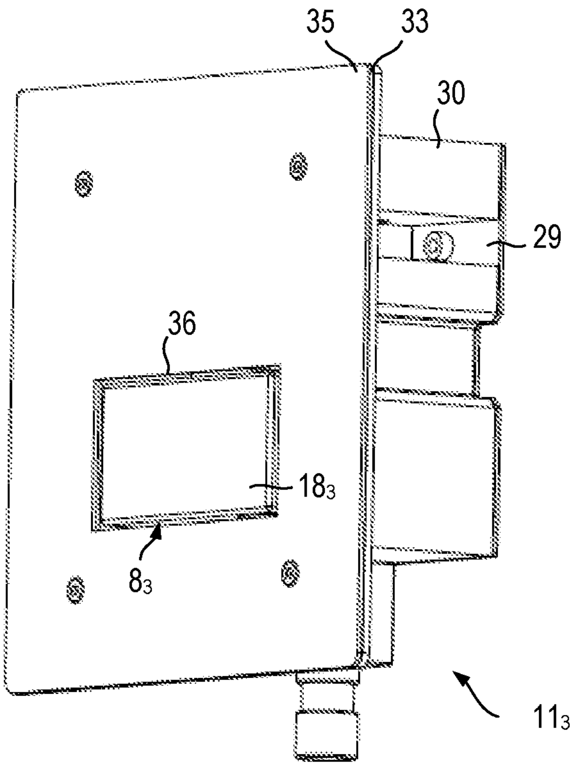
FIG. 12 is a perspective view of a front of a third spray head unit.
Figure 13:
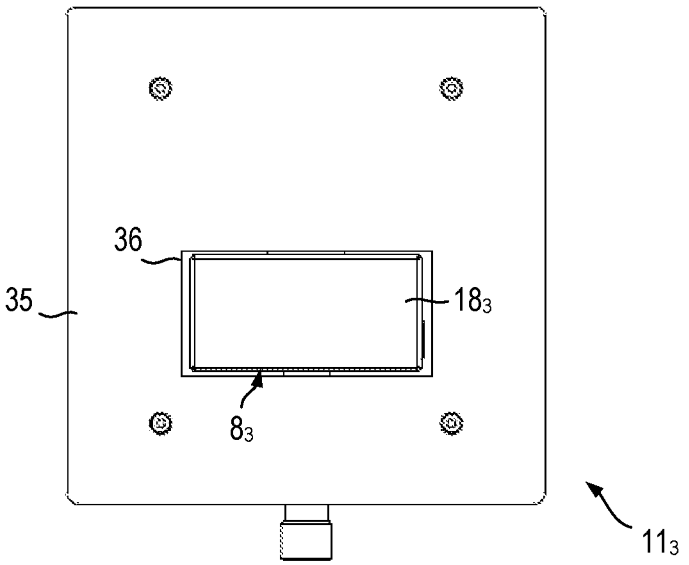
FIG. 13 is a front elevation of the third spray head unit shown in FIG. 12 when a manifold is in a parked position.
Figure 14:
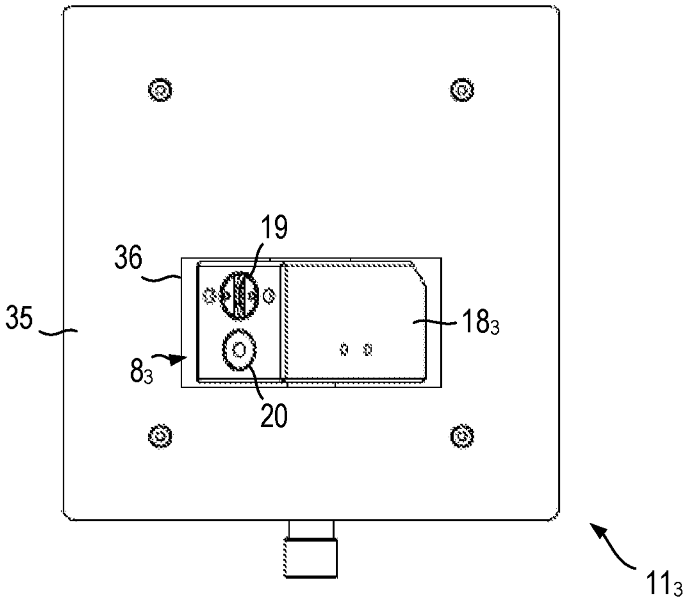
FIG. 14 is a front elevation of the third spray head unit shown in FIG. 12 when a manifold is in an operating position.
Figure 15:
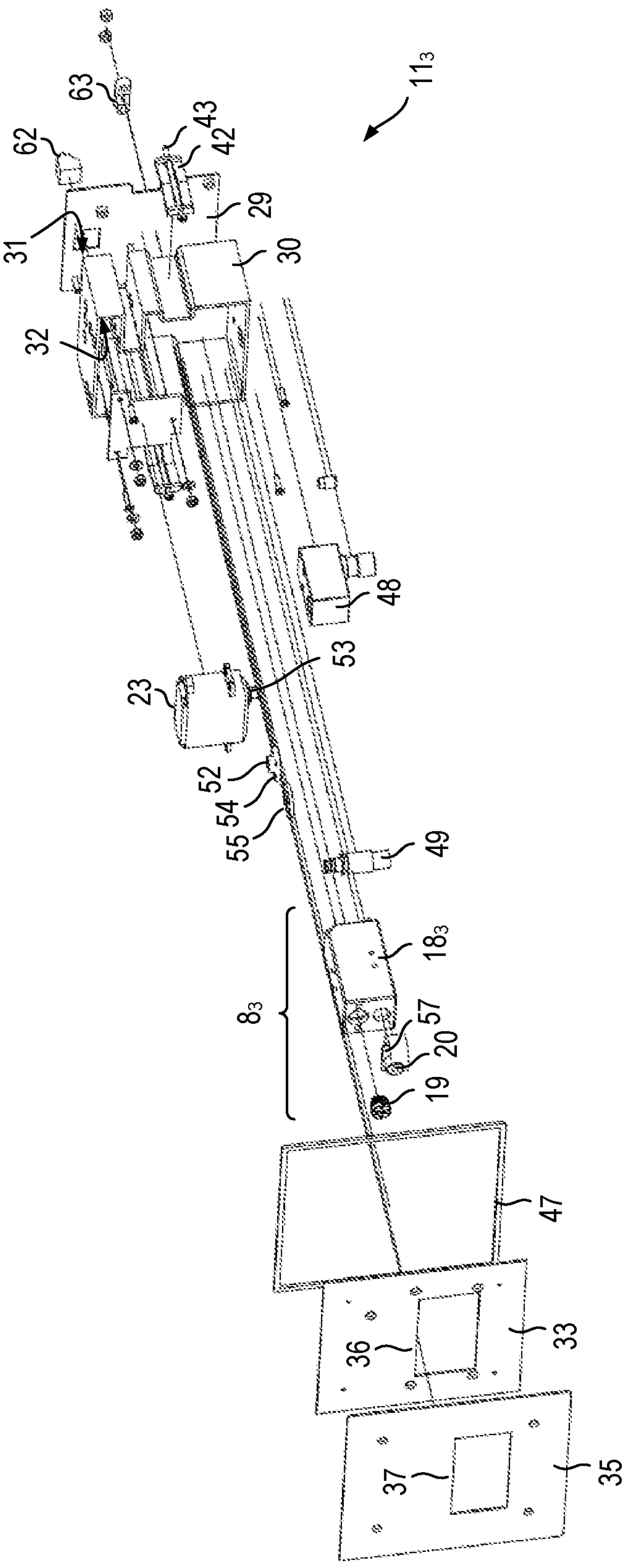
FIG. 15 is an exploded perspective view of the third spray head unit shown in FIG. 12.
Figure 16:
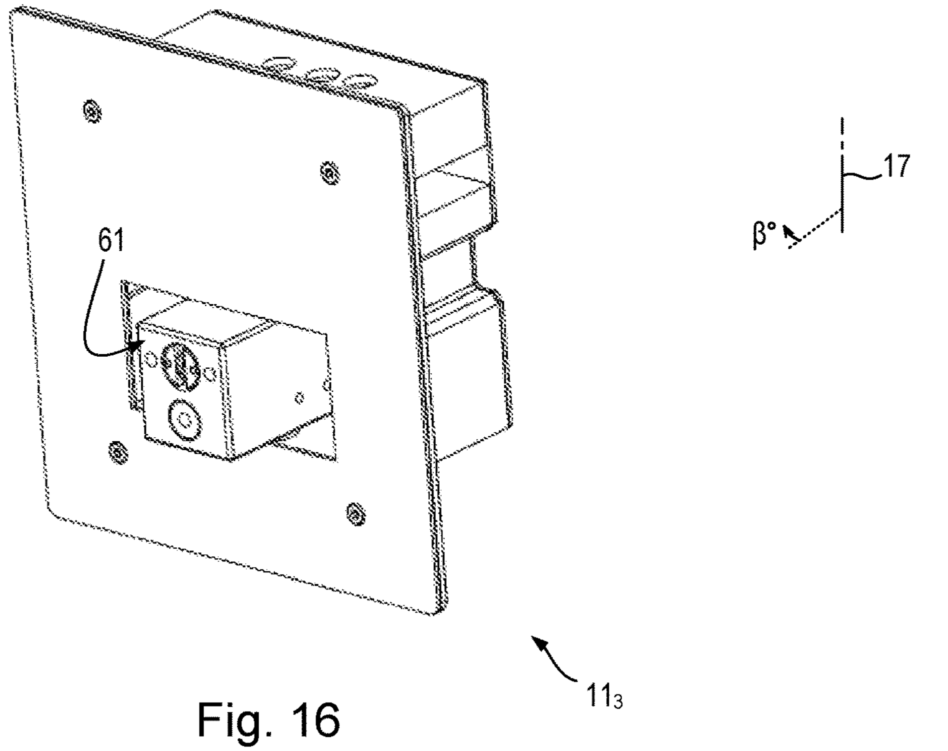
FIG. 16 is a perspective view of the front of the third spray head unit shown in FIG. 12 when the manifold is in an operating position.

First, a standard single-gang back box is not used as a main enclosure 15 (FIG. 8). Instead, the third spray head unit $\mathbf{11}_3$ comprises a back plate 29 and a short section of tubing 30 having a shaped profile and which provides enclosure side walls. The tubing 30 has a length, l, between its rear 31 and front 32 (herein also referred to as "ends" of the section). The back plate 29 and tubing 30 together with an oversized front plate 33 form an enclosure 34. The third spray head unit $\mathbf{11}_3$ also includes a cosmetic outer front plate 35 which is slightly larger than the front plate 33. The front plates 33, 35 have respective apertures 36, 37 through which the spray manifold $\mathbf{18}_3$ can protrude during operation.

The tubing 30 is generally short, i.e. its length, l, is less than its height, h, and width, w. The tubing length, l, is 60 mm. The tubing 30 is extruded and consists of aluminium. The ends 29, 33 also consist of aluminium.

The tubing 30 can be rigid and can allow various structural features to be created at low cost.

Figure 17:
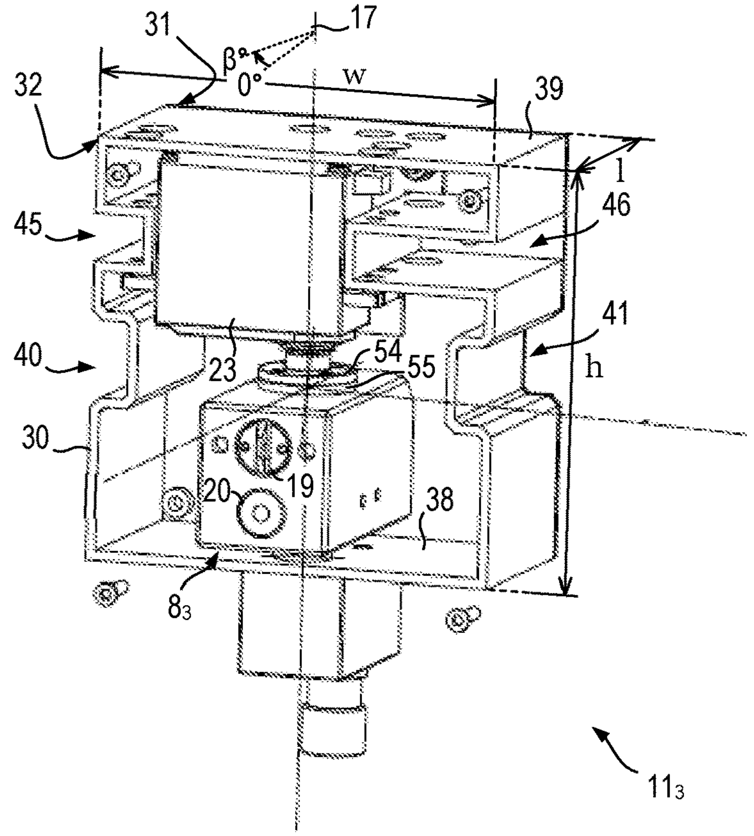
FIG. 17 is a perspective view of the front of the third spray head unit without front covers.
Figure 18:
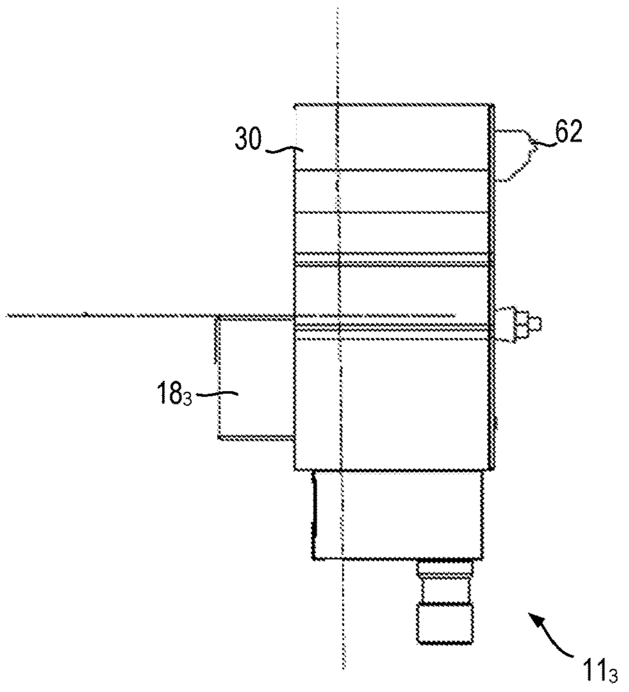
FIG. 18 is a side elevation of the third spray head unit shown in FIG. 17.
Figure 19:
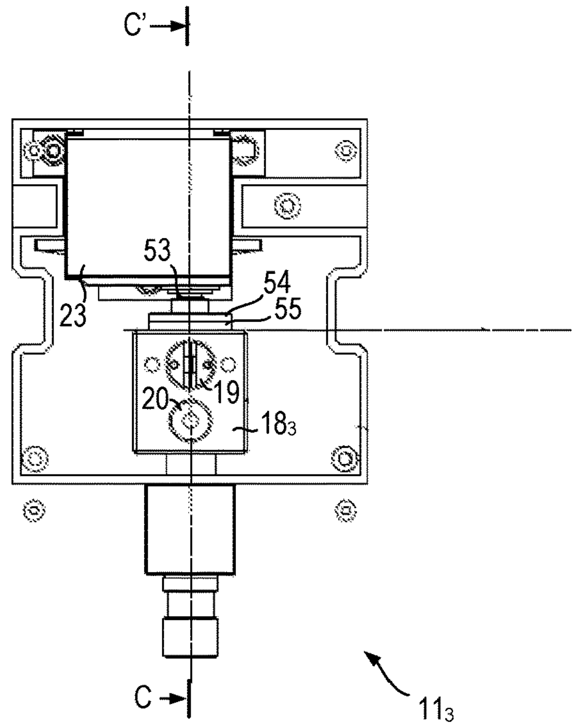
FIG. 19 is a front elevation of the third spray head unit shown in FIG. 12 without front covers, when a manifold is in an operating position.

Referring in particular to FIG. 17, about half way between lower and upper walls 38, 39, the profile turns inwardly and then outwardly again to form recessed side channels 40, 41 on opposite sides of the tubing 30. As will be explained later, the side channels 40, 41 receive respective clip brackets 42 which expand outwardly when contracted using a screw 43 so secure the enclosure 34 in a recess (not shown) in a wall 12 (FIG. 2).

Between the recessed side channels 40, 41 and the upper wall 39, the profile turns inwardly and then outwardly to form opposing inward protrusions 45, 46. The fourth protrusion 46 extends further than the third side channel 45. As will be explained in more detail later, the profile defines wall portions for mounting the servo motor 23 within the enclosure.

Various holes are provided in the tubing for screwdriver access.

A plastic seal 47 is interposed between the outer front plate 35 and the wall 12 (FIG. 2) so as to mask the gap between the outer front plate 35 and the wall 12 arising from the inner front plate 33.

When activated, water enters the movable spray head $\mathbf{11_3}$ through a pivot base 48 having an upper portion 49. The pivot base outlet passes through the underside of the tubing 30, i.e. through the lower wall 38. A hole 50 in the lower enclosure wall 38 is chamfered, i.e. countersunk, on the underside. This allows space for an upper portion 49 of the pivot base 48 surrounding an outlet 51 where the outlet 51 is welded to the rest of the pivot base. The chamfered hole 50 can help to provide a more rigid arrangement which can avoid distortion once the pivot base attachment screws are tightened.

The back plate 29 covers the rear 31 of the tubing 30. The back plate 29 and the inner front plate 33 are attached to each other by means of threaded fixings in a three-point mounting arrangement. The fixings are positioned to help limit bowing of the inner front plate 33 when screws are tightened. Bowing of the inner front plate 33 not only detracts from its appearance, but also may mean that the front of the spray head can be too far forward or backwards, or otherwise misaligned with the manifold, when parked.

The top surface of the movable head $\mathbf{8_3}$ has a splined hole 52 to receive a cog 53 of the servo 23. The hole 52 is set in a metal disc 54 which is mounted to the moving head $\mathbf{8_3}$ via a rubber disc 55 which can provide some flex and damping should the motor cog 53 be slightly misaligned.

The assembly fits into a hole (not shown) in a wall 12 (FIG. 2) having a depth of approximately 60 mm, height of approximately 120 mm and width of approximately 86 mm. The height of the wall hole (not shown) is greater if the wall is deeper. This is because the assembly is tilted to get the inlet port 21 behind the wall. As the assembly is tilted, the top of the unit is raised as it pushes into wall (due to the now angled pivot base). A forward edge of the pivot base 48 can be chamfered so as to help facilitate installation.

The third spray head unit assembly includes a cable 56 which runs from a small printed circuit board (PCB) 57 which supports the thermal sensor 20 to a main PCB 58, inside the head assembly, where it is attached by means of a header 59. The cable (not shown) undergoes significant movement as the sensor and nozzle are rotated in operation.

Referring to FIGS. 20, 21, 22 and 23, the cable 56 is arranged in a diagonal path P through the manifold $\mathbf{18_3}$ from the front bottom of the unit, where the sensor 20 is mounted, to a hole 60 in the top of the manifold $\mathbf{18_3}$ which is close to the axis of rotation. This helps to reduce the distance travelled by the cable (not shown) as the head rotates and, thus, reduce the chance for snagging or other problems, such as work hardening.

The cable 56 is preassembled with its header 59 and the bare wire end is pulled through the diagonal cable path within the rotating manifold $\mathbf{18_3}$. The bare wires are pulled through the front face 61 of the manifold $\mathbf{18_3}$ and soldered to the sensor board 57. The sensor board 57 is then pushed into position while the cable is gently tightened. The sensor 22 is then potted using a potting compound (not shown), filling a shallow cylindrical hole in the base of the movable head.

Figure 24:
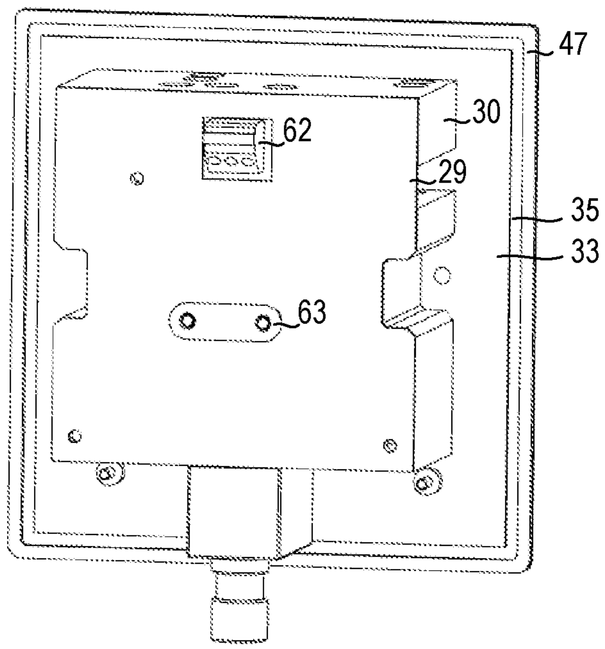
FIG. 24 is a perspective view of a rear of a third spray head unit.

Referring in particular to FIG. 24, external connection for power and communication to the main head PCB 58 takes place via screw terminals 62. A plastic cable grip 63 on the exterior of the rear plate 29 provides strain relief to a communication/power cable (not shown). Preferably the communication/power cable (not shown) is a fire-resistant, three-core power cable which is used to carry power and data.

Figure 20:
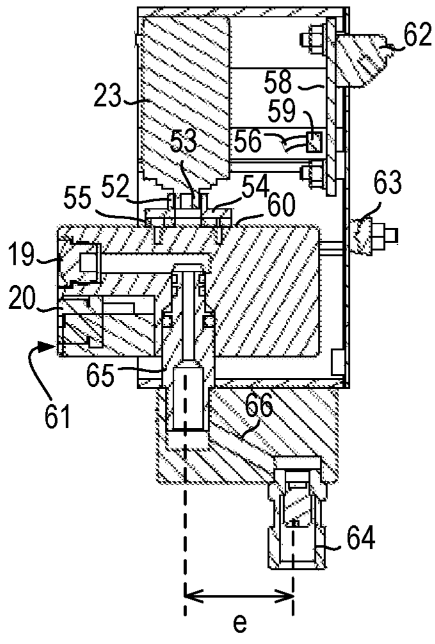
FIG. 20 is a cross section of the third spray head unit shown in FIG. 19 taken along the line C-C.

Referring in particular to FIG. 20, an inlet 64 and outlet 65 of the pivot base 48 are eccentrically offset by a distance, e. The offset allows a high-pressure supply hose (not shown) to be recessed in the wall while the centre of rotation of the movable head is as far forward as possible. The position of the centre of rotation takes not only this requirement into account, but also the requirement that, when the manifold is parked, it is flush with the outer faceplate 35, and the requirement that the achievable field of view, as the manifold is swept through its full range of motion, should be as wide as possible without the faceplate obscuring its line of sight to the potential fire.

An internal water channel 66 runs diagonally within the pivot base 48. This can help facilitate manufacture as it can avoid the need to drill separate horizontal and vertical water paths through the pivot base 48 and then weld shut unwanted apertures.

Figure 20A:
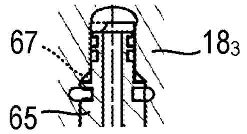
FIG. 20*a* is a magnified view of an outlet port.
Figure 21:
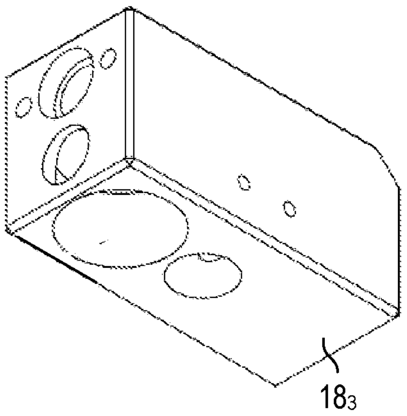
FIG. 21 is a perspective view of a spray manifold.
Figure 22:
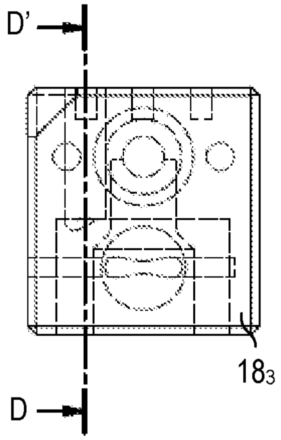
FIG. 22 is front elevation of the spray manifold shown in FIG. 21.
Figure 23:
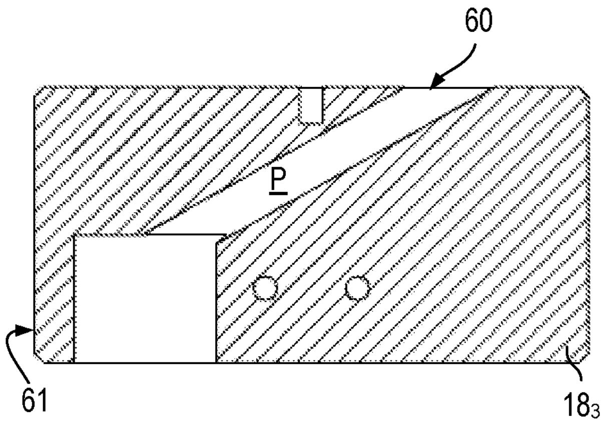
FIG. 23 is a cross section of the spray manifold shown in FIG. 22 taken along the line D-D'.

Referring to FIG. 20*a*, a shoulder 67 can removed from the pivot base exit port 65. This can help to reduce friction when the manifold $\mathbf{18_3}$ rotates as the contact area is reduced.

Figure 25:
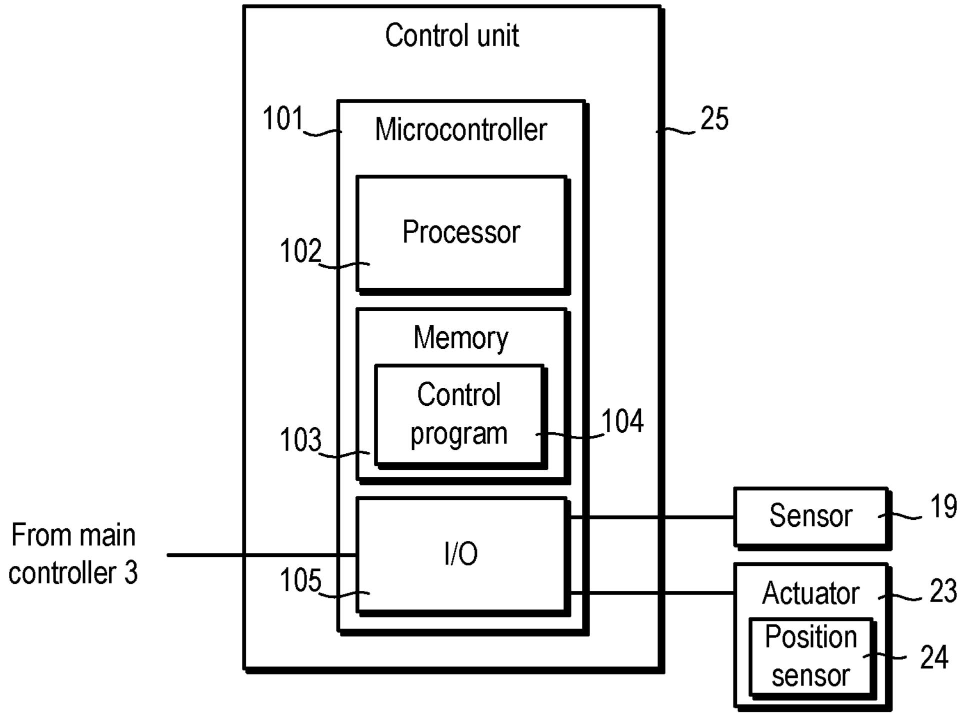
FIG. 25 is a schematic block diagram of a control unit.
Figure 26:
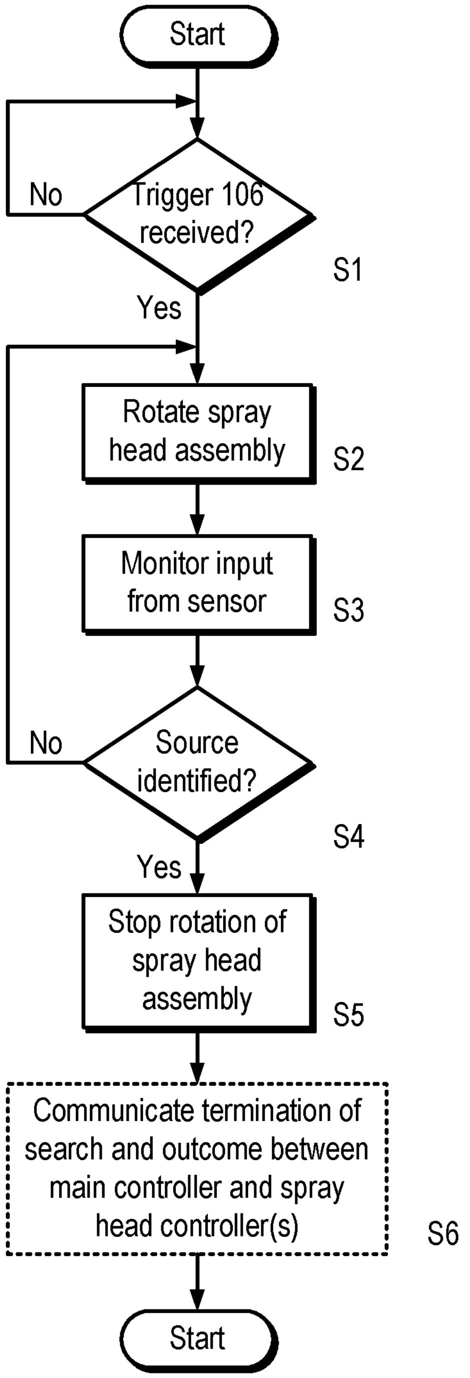
FIG. 26 is a process flow diagram of a method performed by a fire suppression system.
Figure 27:
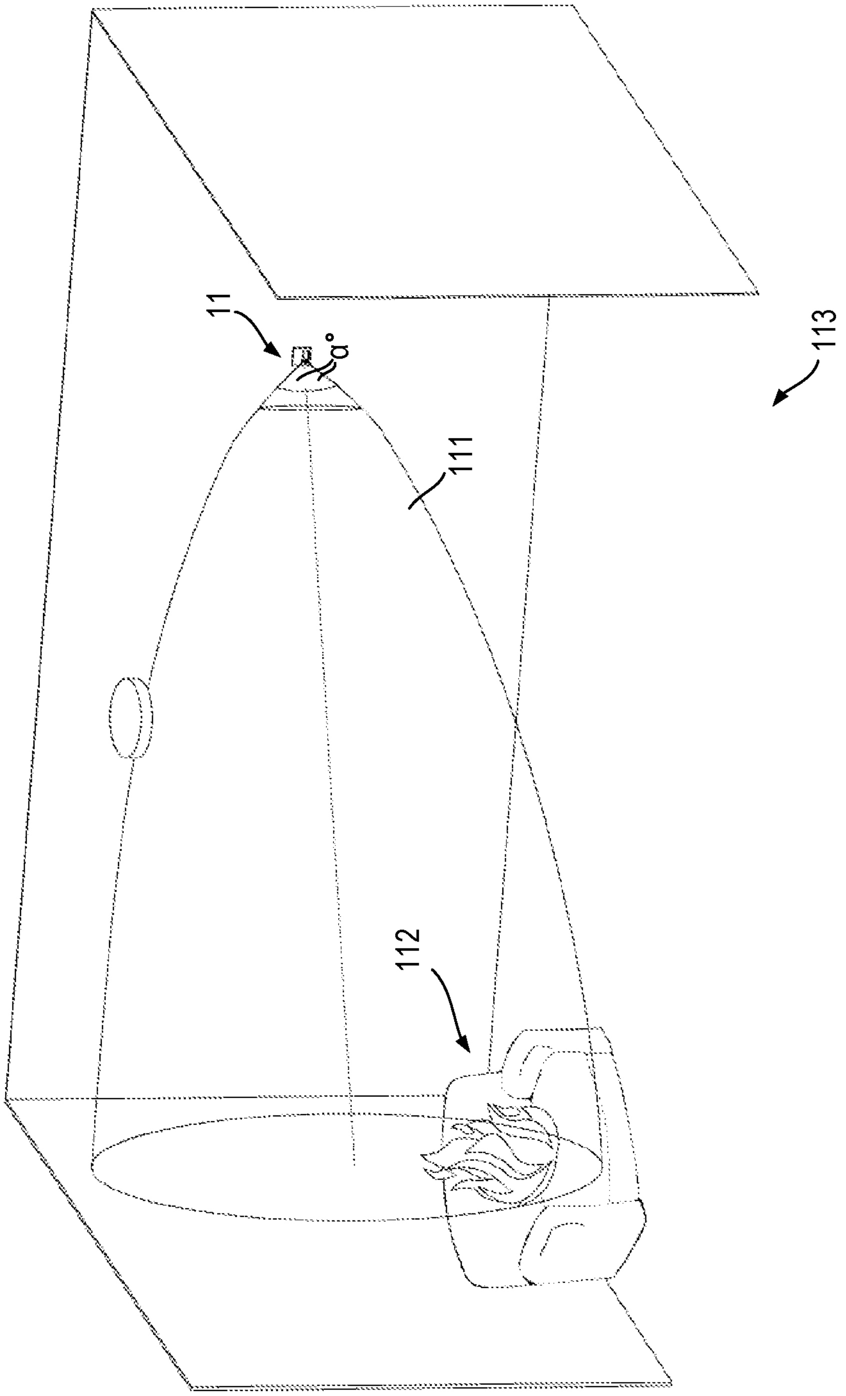
FIG. 27 is a perspective view of a room illustrating the wall-mounted spray head unit in use.

Referring to FIG. 25, the spray head control unit 25 includes a spray head controller 101 in the form of a microcontroller having at least one processor 102, memory 103 which stores a control program 104 and input/output module 105 which is in communication with the main controller 3, sensor 19 and actuator 23. The input/output module 105 may include a wireless network interface. The input/output module 105 may include a power line signalling interface.

The actuator 23 preferably includes a position sensor 106.

Referring also to FIGS. 1, 2, 25 and 26, the controller 101 waits for a trigger 106 from the main controller 3 (step S1). In response to a trigger 106 from the main controller 3 (step S1), the controller 106 causes the spray head assembly 8, for example first spray head assembly $\mathbf{8_1}$ (FIG. 3), second spray head assembly $\mathbf{8_2}$ (FIG. 7) or second spray head assembly $\mathbf{8_3}$ (FIG. 12) to start to rotate first one way, then back the other way through one or more sweeps (step S2) whilst monitoring the input from the thermal sensor 20 (step S3) to establish the azimuthal angle, $\beta$, at which the thermal sensor 20 detects the most significant source of heat using a fire location algorithm. Once the controller 101 has identified the source of heat (step S4), it stops rotation of the spray head assembly 8 (step S5). The controller 101 may send a signal 107 to the main controller 3, a pressure generator 4 and/or control valves (not shown) so as to cause pressurised fluid 5 to be supplied to the rotatable spray head assembly's supply hose when the angular location of a fire has been successfully identified.

The process may be modified. For example, if a signal indicating the presence of a fire stops after a short time, for example a period lying in the range between 10 to 15 seconds (e.g. 12 seconds), activation may be cancelled and the head(s) park the head(s). If there are multiple heads, all but a chosen head may be parked before triggering the pump.

The fire locating process can be implemented by the main controller 3 or by the local control unit 25. In the case that the main controller 3 carries out fire location, the main controller 3 issues position commands to the control unit 25 and receives temperature data from the control unit 25. In the case that the control unit 25 carries out fire location, the control unit 25 can autonomously cause the head to sweep and determines on the location of the fire. In some embodiments, the fire locating process may be implemented by the main controller 3 and/or the control unit(s) 25 of one or more spray heads 8.

Power to the spray heads 8 need not be supplied from the main controller 3.

The main controller 3 and the spray head(s) 8 need not communicate by a wired link, but can communicate via a wireless communication link, such as a WiFi or BlueTooth (®) link or a mobile telephone communications link (for example, GSM, EDGE, 3G, 4G or 5G). The main controller 3 and the spray head(s) 8 may communicate via power line signalling.

The spray head 8 may include a data recording and logging and/or transmitting unit (not shown). The data recording and/or transmission unit may be implemented all or in part by the spray head control unit 25. The data recording and logging and/or transmitting unit may be used to record data, such as sensor readings and control signals, either continuously or in response to fire detection. The data may be stored in non-volatile memory (such as a solid-state drive) or mass storage (such as magnetic hard disk drive). The non-volatile memory or mass storage may be disposed in a fire-resistant housing. The data may be transmitted to a remote location continuously or in response to a predetermined event, such as fire detection. Thus, the spray head can provide so-called "black box" functionality which provides data for helping to establish the cause of the fire and/or to obtain other information about the cause or spread of a fire.

The faceplate 13 protects the spray head assembly 8 from inadvertent access or damage by persons. The faceplate may be of the standardised dimensions of an a.c. electrical blanking plate and may attach by means of a pair of bolts (not shown) with centre spacing and threads compatible with the aforementioned blanking plates in the manner described in WO 2013/114077 A2.

The faceplate 13 has an aperture 14 which is large enough to allow the rotatable spray head assembly 8 to rotate through the range of azimuthal angles without obstruction to the sensor 20 or nozzle 19.

The fire detector 2 is preferably a fixed point heat detector with a set point between 57° C. and 58° C. The system 1 may alternatively be arranged to be activated by one or more smoke detectors. This can provide earlier activation and therefore may allow a fire to be suppressed before it grows excessively. When activated by heat detectors, a fire location algorithm may involve a simple series of passes to identify the azimuthal angle at which the greatest average temperature is detected. If a smoke detector is used, the fire location algorithm additionally confirms that a fire is actually present. It can detect that the fire is growing by means of a delay or additional sweeps. Where standardised detectors are used, they may conform to a standard, such as BS 5446 parts 1 or 2, or BS EN 54 parts 5 or 7, as appropriate.

A detection system may be supplied with controller 3, pump 4 and spray head(s) 8. The main controller 3 may have a standardised interface allowing multiple detection options to be purchased separately. The main controller 3 may be connected to a detection system indirectly. For example, the main controller 3 may be connected by means of an electrical signalling cable to a pressure generator which in turn is linked wirelessly to the heat or smoke detectors by means of a wireless relay.

Referring to FIG. 25, the system 1 using a spray head unit 11 in accordance with the present invention can allow a jet in of fire suppressant liquid droplets (preferably water or water-based) to be aimed in the general direction of a fire 112, based on the identification of the hottest zone within the room 113. The use of heat detectors to activate the device can help to ensure that a large fire is underway when activation occurs, which is simple to identify and locate using the thermal sensor 20. The jet in of droplets preferably form a thin vertical sheet of watermist with a suitable shape to permit little wastage of water on the ceiling and floor and with sufficient droplet velocity for the spray to travel several metres. Preferably, the water jet 41 consists of droplets of approximately 40 to 120 microns in diameter, created by forcing the fire suppressant fluid at pressures of approximately 75 to 110 bar through a small orifice.

Preferably, the orifice and associated nozzle components are configured to deliver a thin vertical fan of mist whose droplets exit the orifice with an approximately uniform distribution of velocity vector angles between $\alpha°$ above horizontal and $\alpha°$ below horizontal. Preferably, $\alpha$ lies between 25 and 40 but may be larger, such as 55 or 60; even more preferably, $\alpha$ takes the value approximately 32.5.

The aerodynamic interactions between droplets cause the fan to narrow as distance from the nozzle increases, as droplet velocity vectors align increasingly with each other with distance, forming an approximately collimated horizontal jet by a distance of 2 m from the nozzle. Preferably, the spray nozzle is mounted at a height of 1.25 m so that in a typical room height of 2.5 m, the Coanda effect with ceiling and floor will further collimate the jet, increasing its effective range and hence the distance at which the fire suppression remains effective.

The fire protection system 1 can have one or more advantages.

The fire protection system 1 can use small quantities of water (or other fire suppressant materials) since it applies watermist towards the fire and to a narrow band above and/or below it. In experiments, this was found to permit a much smaller quantity of water to achieve the same quality of fire suppression that is required of conventional sprinklers, which may use over too litres per minute, versus a typical 5.6 litres per minute for certain embodiments of the invention.

The spray head 11 is small and easy to install. It can be visually discreet and can easily be rendered aesthetically pleasing when installed, as it can easily be configured to resemble an electrical outlet plate, light switch plate or electrical blanking plate. It is also possible to implement the system 1 at low cost, rendering it even more appropriate for use in the home.

Its one-axis operation, horizontal spray direction, mid-height mounting position and narrow-beam mist spray shape allow a much simpler pointing mechanism and faster one-dimensional scan in order to locate a fire, allowing the creation of a low-cost, but effective product.

Using high-pressure water mist with an approximately collimated spray jet and the Coanda effect interactions with the ceiling, floor and/or walls which may often be parallel with the spray direction can allow effective delivery of a fire suppressant liquid directly to the fire, at a range of up to at least 6 metres from the spray head. The choice of coaxial fluid injection into the rotatable spray head assembly is superior to the alternative approach of using a flexible fluid coupling such as a hose, as such flexible couplers tend to have large bend radii and may suffer from fatigue if repeatedly flexed; the superiority of the coaxial approach is even greater when the working pressure is above 75 bar, as hoses designed for such pressures may have reduced flexibility.

A calibrated, non-contact infrared thermometer 20 allows the fire location algorithm to use both the average temperature observed and, optionally, the rate of change of that temperature, to inform the twin decisions of in which azimuthal direction the fire lies, and whether in fact to activate the pressure generator and/or valves.

The fire location algorithm may seek the azimuthal angle offering the hottest sensed temperature by conducting one or more sweeps back and forth between approximately −75° and +75° and recording the measured temperature data at each position. This may be achieved either by storing summary data for each sweep (for example the azimuthal angle where the peak temperature was observed and that temperature value), or by storing all measured sensor data for each sweep in an array indexed by azimuthal position. Successive sweeps can either be compared in summary form or can be stored in successive arrays by means of a two-dimensional array or similar table, and these array lines compared with each other.

In its simplest form, the algorithm can scan the rotatable spray head assembly back and forth. Once, after at least a minimum number of sweeps has been made, a suitable azimuthal "hottest" position can be unambiguously identified due to consistent sensor readings, this identified position is used, the rotatable spray head assembly fixed at that azimuthal position, and the pressure generator and other ancillary systems activated at that point. If a suitably consistent azimuthal position cannot be identified, the sweeps will continue back and forth, up to a maximum number of sweeps, after which the best candidate position will be selected based on the information available.

In a more advanced version of the algorithm, the algorithm additionally makes the final determination as to whether the system should activate and spray the suppressant liquid. Such a version can be used with any detector prone to nuisance activations, such as smoke detectors. After each sensor sweep, the algorithm will identify the best candidate for the azimuthal angle of the fire, and verify that at that azimuthal angle, either the observed temperature exceeds a critical threshold, or that the peak temperature at or around that position is increasing faster than a critical rate threshold. Alternatively the algorithm may assess the statistics of observed room temperatures across a sensor sweep and may infer the presence of a fire from these, for example observing that even the lowest room temperature on each sweep is rising, or that the average observed temperature across the sweep is rising between sweeps. If the verification is not obtained, the fire suppression system will not activate.

The spray head 11 is preferably mounted at a height of between 1.20 and 1.30 m or 1.40 m, for example 1.25 m, and with direct line of sight of all possible fire hazards that the spray head is intended to tackle. Preferably it is not mounted opposite an open fire or where a radiator or other heat source which subtends a large solid angle falls within its view.

At the time of installation and as part of a subsequent maintenance regime, the spray head 11 can be commissionable and testable in-situ. This is achieved via a commissioning process which includes verification that:

- The heat, smoke or flame detection system is operational and successfully interlinked with the rest of the mist suppression system and/or the spray head 11
- The spray head and/or the rest of the mist suppression system operates on demand at a correct working pressure, which is indicative of its water path having the correct impedance i.e. no significant leaks or blockages
- The spray head can successfully identify an artificially provided heat source.

The IR temperature sensor mounted on the rotatable spray head assembly can be tested by scanning the assembly back and forth and measuring the angular variation of the measured temperature. If the temperature varies in an approximately repeatable manner with angle, and if this variation does not strongly depend on the sweep rate, and if the room temperature is within normal expectations, and if the temperature does not vary significantly when the sensor is held stationary for several seconds, the sensor can be regarded as operational. Preferably, when the rotatable spray head assembly is in a "parked" position, a known component acting as source of heat should be within the field of view of the IR temperature sensor so that an additional test of the sensor can be conducted by bringing the warm component in question into view, and optionally by causing it to warm up and/or cool down on demand. This component may for example be a resistor or power transistor. These tests together also serve as a partial test of the effective operation of the invention's motor drive. Preferably, the motor drive uses an appropriate motor type which also allows its correct position to be verified electronically by the microcontroller.

The installation procedure can optionally include a training process in which typical maximum observed temperatures are measured with respect to azimuthal angle. In this process, known sources of heat such as radiators would be activated and allowed to warm up before the rotatable spray head assembly is taken through a calibration sweep. This training process can optionally be extended to an automated learning process over time, to allow collection of typical temperature variations with respect to azimuthal angle, allowing an installed system to perform a more sophisticated rejection of unwanted activations or incorrect hot targets such as radiators, over time.

The spray head may be interfaced directly or indirectly to remote diagnostic and/or alerting equipment by means of a communications network such as a cellular radio network or the Internet. This network permits remote alerting of the presence of a fire and of equipment activation; it allows remote signalling of any detectable faults such as failing or failed batteries in heat or smoke detectors, a failure to rotate correctly of the rotatable spray head assembly, or a failure of the assembly's thermal sensor. It can straightforwardly be arranged that the invention perform a self-test with remote signalling of the result periodically, and/or the self-test may be on-demand, prompted by a local signal (e.g. a button press) or remote signal (e.g. a text message, e-mail message, or an HTTP page load by a remote server of a URI served up by the invention or its associated equipment).

Communication between elements of the overall suppression system including pressure generators, control valves, the spray head and separate heat, smoke or flame detectors, can employ a variety of technologies. Preferably, the heat and smoke detectors are interfaced to other devices using a wireless radio protocol, which offers the benefit of ease of installation of the detectors. Preferably, the communication link between the spray head and the pressure generator that serves it should be by cable connection. A physical cable between these components can be implemented at very low cost, and can be installed at the same time and along the same route as the high pressure hose that connects the pressure generator to the spray head. The cable may be an Ethernet cable such a Category V or Category VI cable, or fire-resistant variants thereof. The system may employ a traditional networking technique such as TCP/IP over the cable, or it may use RS-485 or another protocol. Alternatively the cable may be used to provide a simple Normally Open contact which can be closed in the event of a fire, either to signal activation from another part of the system to the spray head, or to allow the spray head to signal a fire to the pressure generator to which it is connected. The cable may also be designed to carry sufficient electrical voltage and current to provide power for the spray head's motorised movement and to power the electronics therein. For example the cable may be used in the manner known as "Power over Ethernet (PoE)". The cable must be terminated at either end by a connection technique that is robust to mechanical vibration, ingress of dust, and diurnal temperature variations over many days. For example, screw terminals may be used, or Ethernet RJ-45 connectors may be used provided that suitably robust connector variants are selected.

In the event of a fire close to the spray head, in which the spray head may need to operate for an extended period at elevated temperatures, the rotatable spray head assembly's axis of rotation and mounting system will remain static even if the motor ceases to function. This is achieved by manufacturing the relevant structural spray head components from metals such as steel and brass. The motor does not form part of the support for the rotatable spray head assembly. The spray head and associated hoses may include some elements which will eventually fail at an elevated temperature that may be encountered in a fire. These components are designed to last at least 30 minutes in the event of a fire; some such as hoses achieve this through water cooling as water flows through them and through some physical separation from the fire by thermally insulating materials.

Broadly speaking, performance declines with distance from the fire, due to factors such as droplets falling out or sticking to the ceiling or walls en route to the fire, and a lack of perfect spray beam collimation leading to a more diffuse suppression spray at greater distances. The system is tested to pass sprinkler standards with the spray head at a maximum allowable distance from the fire. The maximum allowable distance is determined through testing and will depend on the water flow employed. For example the maximum allowable distance may be 6 m.

By contrast, if the fire occurs directly below the spray head, or above/below it and within 1 metre, the spray beam may in some cases (at such a short working distance from the nozzle(s)) be too narrow to spray the fire directly; however in tests it was found that the apparatus can still suppress the fire adequately to pass the requisite sprinkler tests. In such cases, one contributory factor to this effective suppression is the following process. The high density of droplets close to the nozzle and their high speed at that location creates an air draft which draws the flames towards and into the spray. This helps prevent the flames from growing beyond the height of the nozzle.

If new sprinkler tests are evaluated at a later date and it is discovered that fires close to the spray head cannot be adequately suppressed without additional elements, the system design guidelines can be readily adapted to ensure that there is no such unprotected position in the room, by the use of extra spray heads, and if necessary the associated additional pumps and/or control valves to service that spray head. Other strategies may also be used to obviate the need for such additional spray heads, including a shaped spray pattern that emits a small proportion of the emitted spray downwards and/or upwards, so that beyond the angle $\alpha°$, the droplet flux does not drop completely to zero; and including additional nozzle(s) pointing up and down.

It will be appreciated that many modifications may be made to the embodiments hereinbefore described.

For example, there may be more than one nozzle.

There may be more than one sensor. The sensor(s) may be provided in faceplate or cover, for example, above or below the aperture. The sensor(s) may be fixed. Thus, the thermal camera or row of thermal sensors may allow the unit to perform a virtual scan.

An improvement may be to add another strategy to tackle fires directly below (or above) the spray head by providing a different water path when the spray head is in the aforementioned parked position. A small funnel is provided to one side within the mounting box so that if the pressure generator is activated while the spray head is "parked", the watermist jet is captured by this funnel and the flow redirected to orifices below and/or above the spray head. The watermist spray will be much reduced in velocity by this arrangement but can act similarly to a conventional sprinkler within a small area adjacent to the spray head. Such a feature would be used when the fire location algorithm was able to conclude that the fire was close to the spray head.

Another improvement allows the targeted spray to be used for security purposes in a combined fire and security system. A short burst of spray would be targeted at an intruder based on either body temperature as sensed by the infrared thermometer, or additional passive infrared sensors, and activated by security sensors known in the art such as door switches, PIR detectors and weight detection pads. This spray can be used to "tag" an intruder with a variety of waterborne tagging materials such as specialist inks and labelling systems, which may be introduced into the water flow by means of a venturi or similar arrangement. Such systems are known in the security industry and go by names such as SmartWater. Alternatively such a system may be used to deliver other substances, for example fluids designed to disable an intruder.

As mentioned hereinbefore, the presence of a fire need not be detected using a heat detector. In some embodiments, the fire detector 2 may be another form of detector, such as a smoke or flame detector. One or more different types of detectors may be used. Additionally or alternatively, manual call points may be used.

When using other types of fire detector 2 (i.e. other than heat detectors), that may sometimes activate when there is no fire, the presence of a fire can be confirmed by measuring the temperature of a room using one or more sensors and determining is the (average) room temperature rise. A rising peak temperature is not a necessary requirement. The rise need not be monotonic, but can be confirmed after several sweeps of the head, if necessary. This monitoring can take place simultaneously with the early sweeps of the search for the fire location, effectively forcing activation to be delayed and the sweeps continued until a temperature rise has been confirmed. Alternatively, the fire confirmation phase of the sweep could be separate and carried out prior to carrying out the main scan loop, i.e. a sweep for locating the fire.

It is desirable during the main scan loop, to monitor two temperature "delta" thresholds above background. As the head is scanned through a range of angles, the average temperature is measured across the field of view of the thermal sensor at each position (in the case of a fixed sensor with a virtual scan, one or more pixels or sensors corresponding to each angular position are used to synthesise a suitable field of view for each position). Peak positions and temperatures are monitored and when this peak temperature breaches an upper threshold, which may be about 50° C. above background, rapid activation ensues with minimal concern for further refining the exact location of the fire. The fire in this situation can be assumed to be large and/or close and therefore rapid activation is more important than precise targeting. A lower threshold may be 15 to 20° C. above background. When temperature peaks are observed above this lower threshold (but below the upper threshold), the scan continues for longer and the fire suppression activates only once repeatable data is obtained on the fire's location. An overall timeout of, for example, 2 minutes, allows time for the system to refine the position of the fire, but ultimately allows for the possibility that the fire cannot be fully observed due to obstruction. After this timeout, if a trustworthy detection system is being employed to activate the system (such as heat detection), the system will activate. If the system has been configured to use the thermal sensor 20 to check that a fire is present, then the system will activate at this point only if that confirmation has been obtained, and if not, the system can either be designed to continue to scan indefinitely, or to scan until the input alarm deactivates, or can fully return to standby after a preset period.

In the case of a thermal sensor 20 that physically scans with the moving manifold, at the extremes of a scan range, a thermal sensor's field of view of 35° may become partially or fully occluded by the faceplate. In a device where the scan is configured to continue beyond the beginning of this occlusion, for example where the spray "beam" is narrower than the field of view of the sensor, the reported temperature can be calibrated to allow for the occlusion. To enable this, the temperature inside the head is known to a reasonable accuracy so that when the sensor's view consists of, for example, 50% view of the room and 50% view of the interior of the head, the known temperature inside the head can be used to infer the true temperature in the room within the unoccluded part of the field of view. The temperature inside the head can be measured using a separate sensor or can be measured by pointing the sensor inside the head as part of the scan.

A smaller angular range can be used. For example, the scan may range from 25 to 155 degrees, thereby resulting in a scan range of 130 degrees. The scan range may be larger or smaller than the range for deploying water.

In the case when a system comprises two or more spray heads 8, the controller 3 and/or control units 25 can carry out more complex fire location and/or watermist deployment processes. For example, more than one head may scan simultaneously when a fire is detected and the head whose observations are most strongly indicative of a fire can then be activated. Other spray heads are blocked off hydraulically so that the pump 4 serves only a single head 8. The decision as to which head is best positioned to serve the fire can be carried out by the main controller 4. Thus, in this arrangements, the control units 25 in the spray heads 8 are slaves, while the main controller 3 serves as a master controlling all sweep activity directly. Alternatively, the decision can be the result of a negotiation between the control units 25 of the spray heads 8 which are capable of managing their own sweep activity and, for example, reporting a confidence statistic that a fire has been found.

If the data link between the main controller 3 and the spray heads have a limited data rate or where packet collisions are likely to affect that rate, or where the link may be compromised or may experience slowdowns, the decision making process as to which head should be activated is preferably delegated to the control units in the spray heads. If, however, the link is fast and reliable, then overall control of which spray head to activate can be centralized in the main controller 3.

The control unit 25 may run a simple loop listening for commands from the main controller 3, responding to those commands. The commands may include "seek position" and "report temperature". A control unit 25 can also report status information including its motor current and IR pyrometer data. It can also be instructed to write settings to the pyrometer IC or write values into the microcontroller static memory at the spray head 8.

Water to any spray head 8 not required to operate may be shut off to help achieve operating pressure. Water shutoff can be controlled centrally (for example, by the main controller 3) or locally. Water shutoff may be provided either as a multiport selector valve (not shown) connected to the outlet of the high pressure pump or, for example, by providing a gate valve (not shown) in each head. A gate valve (not shown) may be integrated into the head rotation mechanism so that the valve is closed when the head is parked. Thus, if spray heads operate to locate a fire, then any spray heads which are not to be used to deploy water mist are parked before the pump operates.

The system may include one or more additional pumps to operate simultaneously with their outputs joined together, thereby helping to increase operating flow and allow more than one head to activate at once.

The system may be integrated into a home automation system (or other commercial or industrial automation system) which also includes controlling heating ventilation and air conditioning (HVAC) sub-system, security sub-system and/or entertainment system. The home automation system may include cameras which allow images or footage to be sent to customers or monitoring centres. This may be used, for example, to allow a remotely-located user or controller to decide whether or not to activate or deactivate the fire suppression sub-system.

The fire-suppressant material may be a liquid, such as water, and the spray head unit may deploy a mist of fire-suppressant material. The fire-suppressant material may be a gas, such as carbon dioxide, and the spray head unit may deploy a stream of fire-suppressant material.

The invention claimed is:

1. A wall-mountable spray head unit comprising:

a rotatable spray head assembly comprising a spray nozzle configured to deliver fire-suppressant material, and a spray manifold rotatable about a first axis, wherein the spray nozzle is supported by the spray manifold, wherein, when the wall-mountable spray head unit is mounted to a wall, the rotatable spray head assembly is configured to rotate the spray nozzle about a first axis up to about ±90° from a reference angle, wherein the reference angle is perpendicular to the wall, wherein the spray nozzle is orientated to deliver the fire-suppressant material radially in a plane defined by the first axis and a second axis which is perpendicular to the first axis, and wherein the spray nozzle is configured to deliver the fire-suppressant material in an arc in the plane of at least 25° above a horizontal axis and at least 25° below the horizontal axis, the fire suppressant material forming a substantially collimated horizontal jet as distance from the spray nozzle increases, wherein the wall-mountable spray head unit further comprises:

an enclosure having an aperture, wherein the rotatable spray head assembly is housed or mainly housed in the enclosure, wherein the spray manifold is shaped as an elongated box including a side face and an end face perpendicular to the side face, the spray nozzle being provided in the end face, and wherein the rotatable spray head assembly is arranged such that, in a parked position, the side face is flush with a faceplate of the enclosure and the spray nozzle is not visible through the aperture and is at about ±90° from the reference angle.

2. A wall-mountable spray head unit according to claim 1, further comprising:

at least one thermal sensor configured to sense in the plane.

3. A wall-mountable spray head unit according to claim 1, further comprising at least one thermal sensor.

4. A wall-mountable spray head unit according to claim 1, wherein the spray nozzle is configured to deliver a mist of the fire-suppressant material.

5. A wall-mountable spray head unit according to claim 1, wherein the spray nozzle is mounted at a height of about 1.25 m.

6. A fire suppression system comprising:

at least one wall-mountable spray head unit according to claim 1;

at least one pressure generator for supplying the fire suppressant material to the at least one wall-mountable spray head unit; and at least one activation device which, in response to an activation signal, causes the fire suppressant material to spray out from the spray nozzle of the at least one wall mountable spray head unit.

* * * * *